United States Patent [19]
Bayer et al.

[11] Patent Number: 5,646,339
[45] Date of Patent: Jul. 8, 1997

[54] FORCE MICROSCOPE AND METHOD FOR MEASURING ATOMIC FORCES IN MULTIPLE DIRECTIONS

[75] Inventors: Thomas Bayer, Sindelfingen; Johann Greschner, Pliezhausen; Martin Nonnenmacher, deceased, late of Schoenaich, all of Germany, by Regine Nonnenmacher, heiress

[73] Assignee: International Business Machines Corporation, Armonk, N.Y.

[21] Appl. No.: 675,429

[22] Filed: Jun. 26, 1996

Related U.S. Application Data

[63] Continuation of Ser. No. 195,401, Feb. 14, 1994, abandoned.

[51] Int. Cl.$^6$ .................... G01N 23/00; H01J 37/26
[52] U.S. Cl. ................ 73/105; 250/306; 250/307
[58] Field of Search .................... 73/105; 250/306, 250/307, 423 F

[56] References Cited

U.S. PATENT DOCUMENTS

| | | | |
|---|---|---|---|
| 4,724,318 | 2/1988 | Binnig | 250/307 |
| 4,992,659 | 2/1991 | Abraham et al. | 250/307 |
| 5,166,516 | 11/1992 | Kajimura | 250/307 |
| 5,193,385 | 3/1993 | Nishioka et al. | 250/307 |
| 5,204,531 | 4/1993 | Elings et al. | 250/307 |
| 5,262,643 | 11/1993 | Hammond et al. | 250/306 |
| 5,267,471 | 12/1993 | Abraham et al. | 250/307 |
| 5,283,442 | 2/1994 | Martin et al. | 250/307 |
| 5,321,977 | 6/1994 | Clabes et al. | 73/105 |

OTHER PUBLICATIONS

"Lateral forces and topography using scanning tunneling microscopy with optical sensing of the tip position", M.A. Taubenblatt, Appl. Phys. Lett. 54(9), 27 Feb. 1989.

"Simultaneous Measurement of Lateral and Normal Forces with an Optical-Beam-Deflection Atomic Force Microscope" Meyer and Ames, Appl. Phys. Lett. 57(20), 12 Nov. 1990.

"IBM Confidential" document, 2 pages, Feb. 2, 1996.

*Primary Examiner*—George M. Dombroske
*Attorney, Agent, or Firm*—Daniel P. Morris

[57] ABSTRACT

A sensor (100) is set forth with which a microscope based on atomic forces is constructed and which represents the forces in up to three components. The sensor (100) is designed such that different vibration modes (transversal and torsional) can be induced individually and each mode corresponds to one force direction.

23 Claims, 4 Drawing Sheets

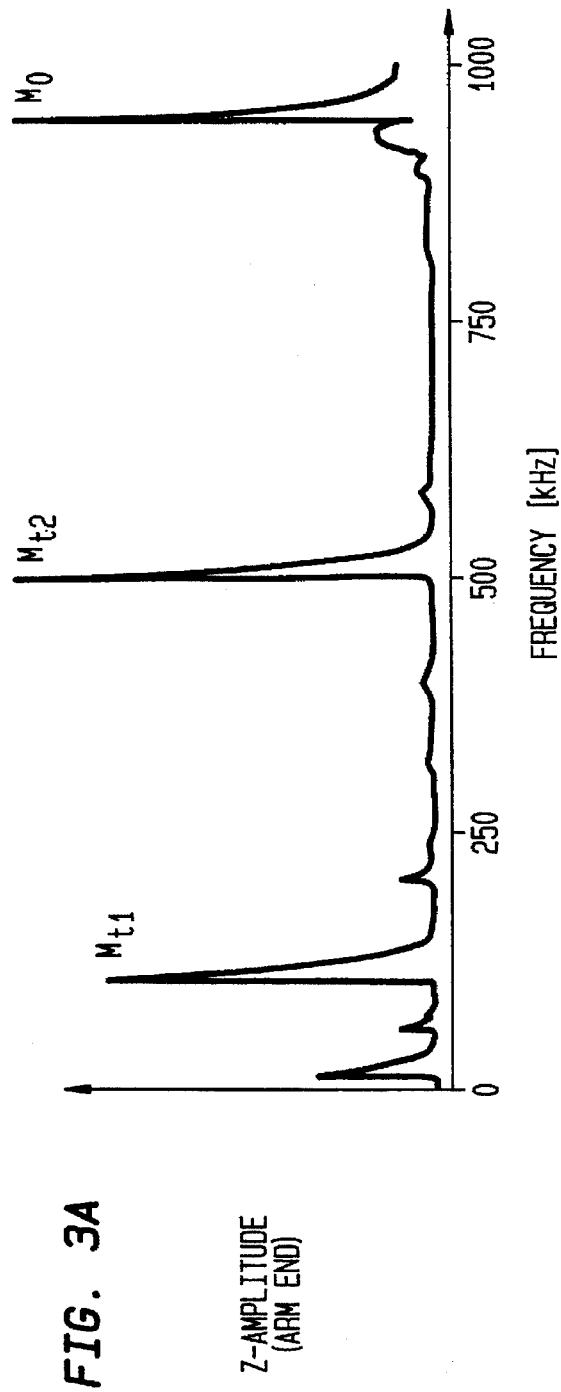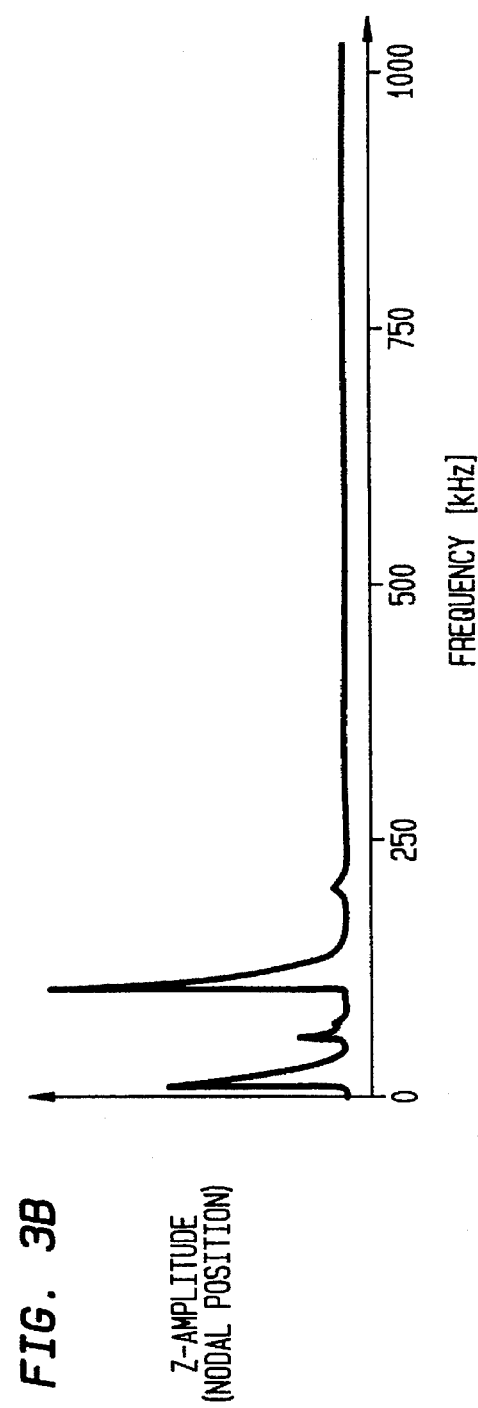

FORCE MICROSCOPE AND METHOD FOR MEASURING ATOMIC FORCES IN MULTIPLE DIRECTIONS

This is a continuation of application Ser. No. 08/195,401, filed Feb. 14, 1994, now abandoned.

FIELD OF THE INVENTION

The invention relates to a force microscope for measuring atomic forces in multiple directions.

BACKGROUND

Sensors for measuring atomic forces have been in use in a wide variety of measuring instruments, chiefly scanning microscopes, since the discovery of the scanning tunnel microscope by Binnig and Rohrer at the IBM Rüchlikon Research Laboratory near Zürich.

In the scanning tunnel microscope, a tiny needle—in the case of Binnig and Rohrer a tungsten needle—is directed near a surface to be examined (ca. 1 nm) such that, when a voltage is applied, the electrons from the tungsten needle can bridge the gap to the surface being examined by virtue of the tunnel effect.

A surface can then be imaged by moving the needle in the equidistant plane (x-y plane), and the distance of the needle tip to the surface (z direction) is then controlled using a positioning element within a closed measuring loop such that the measured electron current is constant.

The advantage of this new type of microscopy lies primarily in the fact that, in contrast to the conventional "distant field" microscope, in which the resolution according to Abbe is limited to the half-wavelength of the radiation employed, the scanning tunnel and scanning force microscopes are "near field" microscopes, whose resolution is not limited by the "wave length" of an employed interaction.

The resolution in the z direction lies on the order of one picometer, while the resolution in the x-y direction, which depends primarily on the accuracy of the needle line tracking, is ca. 0.2 nm.

As is known, however, the scanning tunnel microscope is beset with a number of disadvantages. On the one hand, measurement with respect to the surface structure is not possible in the conventional sense of an image area, but rather only with respect to the area of equal tunnel probabilities of the needle tip electrons towards the surface under examination. With materials whose surface contains only similar atoms, the image of the electron tunnel probability corresponds approximately to the optical representation of the surface. If the surface comprises a material with different atoms (e.g., a multi-atom crystal), however, the image is one of the electrical characteristics of the surface rather than of the optical characteristics as with a conventional, optical microscope.

Although the aforementioned characteristic of the scanning tunnel microscope does not necessarily represent a disadvantage, since excellent data about the surface quality, particularly with respect to defects, etc., can be derived from the electrical characteristics of the surface, application of this instrument is limited to electrically conductive surfaces. There have been experiments to force the surface of originally nonconductive materials—particularly of organic substances—to be conductive by immersion in a conductive liquid, but this has obvious disadvantages, especially when the surface to be examined is intended as an insulation and must retain this function, as for example an insulating oxide layer on a silicon surface.

A further drawback of the scanning tunnel microscope is the fact that the electron current required for measurement can alter the surface, e.g., the molecular structure can be split by the current. This may be a desirable effect when used as a tool for surface treatment, but it is an undesirable effect for a nondestructive measurement.

Based on the aforementioned problems, as early as 1985—also in the IBM Rüschlikon Research Laboratory—the atomic force microscope (AFM) was proposed. In this AFM disclosed by Binnig, Quate, and Gerbar in Phys. Rev. Letters, 56, 930 (1986), the repulsive force of a nonconductive tip (e.g., diamond) with respect to the surface is measured by depressing the tip with an elastic force. Many of the disadvantages of the scanning tunnel microscope have been overcome by this sensor arrangement. In particular, it is also possible to image nonconductive surfaces, and the repulsive force of a nonconductive surface corresponds more readily to the optical image than the plane of equal tunnel probability based on the tunnel effect.

However, a significant disadvantage of the scanning tunnel microscope is not eliminated by the AFM and in certain circumstances is even aggravated. The measurement of the repulsive force itself is conducive to damaging the surface—e.g., by displacing the surface atoms to lower levels, by contamination and deposition of residual impurities in the vicinity of the surface, etc.

Based on this problem, the laser force microscope was developed at the IBM Yorktown Laboratory. Unlike the AFM, this type of force microscope employs far-reaching "weak" interactions, such as the van der Waals forces. The forces, and consequently the surface stress, are lower than in the AFM by several orders of magnitude.

The actual measurement principle of the laser force microscope lies in exciting the probe, e.g., using a piezoelectric transducer, at or near a resonant frequency of the probe and measuring the forces arising from the surface by observing their influence on the resonant frequency.

The measurement can be accomplished either by tracking the excitation frequency to the effective resonant frequency and using the frequency shift as a measure for the force exerted on the probe by the surface (frequency modulation) or by using the reduction of the amplitude directly as a measure for the frequency shift.

While thin tungsten wires were employed in the initial versions of laser force microscopes, silicon needles were also developed whose vibration is then measured with heterodyne laser measurement methods.

This measurement method, in use for several years now, has the disadvantage, however, that the measurement detects only one component of the force, that is, the projection of the force vector onto the axis of the induced vibration. When the force vector is not orthogonal to the surface, for example because the probe is positioned in and at the edge of a depression, the measurement is subject to inherent error.

SUMMARY OF THE INVENTION

The object of the invention therefore is to provide a sensor for use in a force microscope, with which the force exerted on the probe can be measured substantially independently in the x, y, and z directions.

The object of the invention is fulfilled with a probe which can be excited in multiple directions, preferably orthogonal to one another, such that the resonant frequencies of the various excitation modes each occur in one respective direction and are independent with respect to the frequencies.

The benefits of the invention are first that the force measurement detects the x, y, and z components, respectively, of the force exerted on the sensor by the surface. After measuring the different components, a force vector describing direction as well as overall strength is available.

In the preferred embodiment, the x and z components are measured by transversal vibration modes, but the y component is measured by a torsional vibration.

The embodiment is preferred in which the excitation occurs using a piezoelectric element in one direction, e.g., the z direction, and the vibration measurement is accomplished with a heterodyne laser system in the state influenced by the surface.

The invention-related components, devices, and means or processing steps previously described, claimed, or described in the following embodiments are not subject to any particular exceptions with respect to implementation, design, selection, technical architecture, or methodology, so that the known selection criteria in each respective field of application can be applied without restriction.

Further details, characteristics, and advantages of the subject of the invention can be derived from the following description of the related drawings, in which—for purposes of example—an apparatus in accordance with the invention and the inventive method are represented.

BRIEF DESCRIPTION OF THE DRAWINGS

FIG. 3a), b) depict the spectral progression of the vibration amplitudes of a sensor in accordance with the invention in an uninfluenced state, as a function of the excitation frequency.

DETAILED DESCRIPTION

Figure 1:
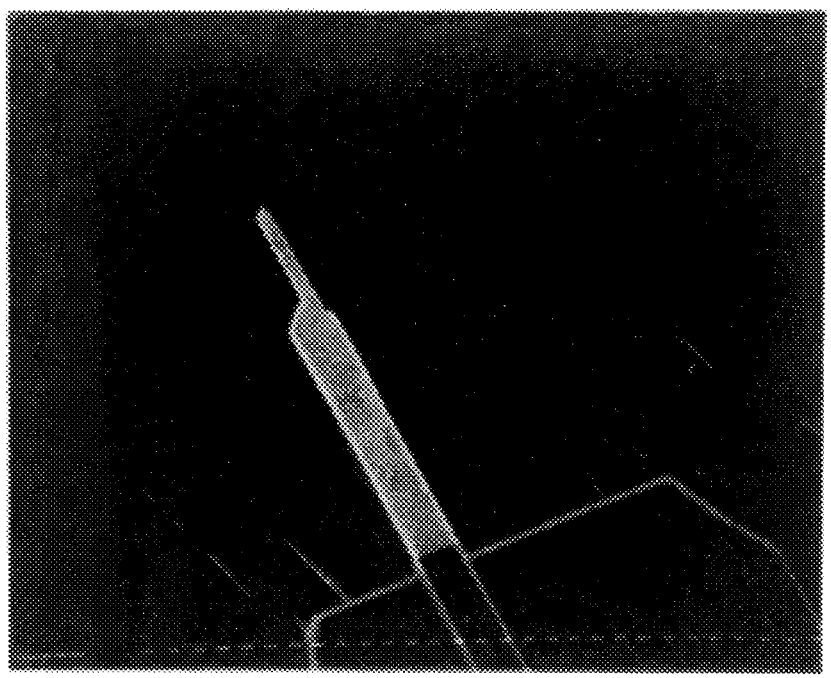
FIG. 1 is an image of a sensor with a double arm.

The sensor shown as an image in FIG. 1 is designated in its entirety as 100 in FIG. 2. The body 10 of the sensor, to which in the embodiment the piezoelectric element is attached to induce vibration, has an arm 11 that, at rest, is flush with the upper edge of the base.

The tip 12 in turn is positioned on the arm 11. The tip represents the actual probe for measuring the force exerted by the surface.

Figure 2A:
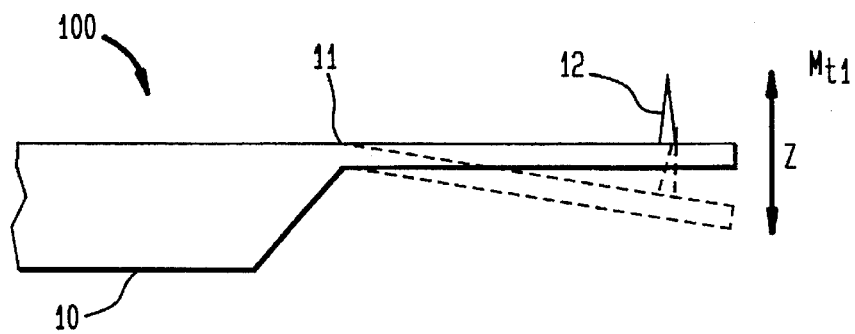
FIG. 2a)–c) shows three vibration modes in the z, x, and y directions.
Figure 2B:
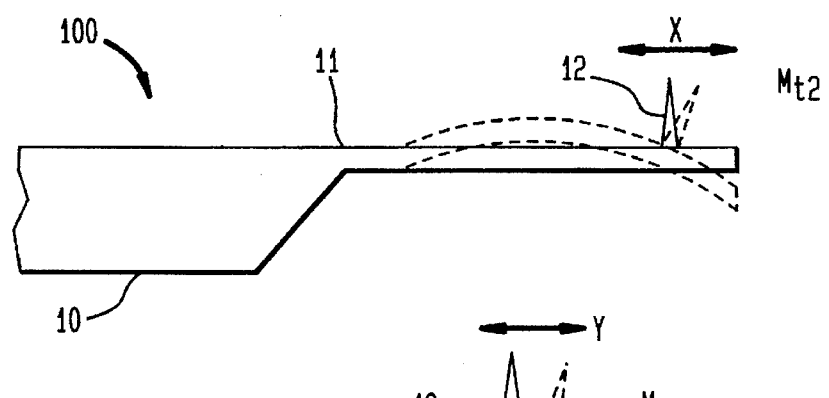
Figure 2C:
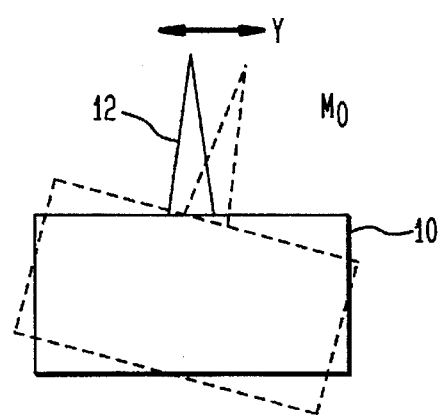
Figure 4:
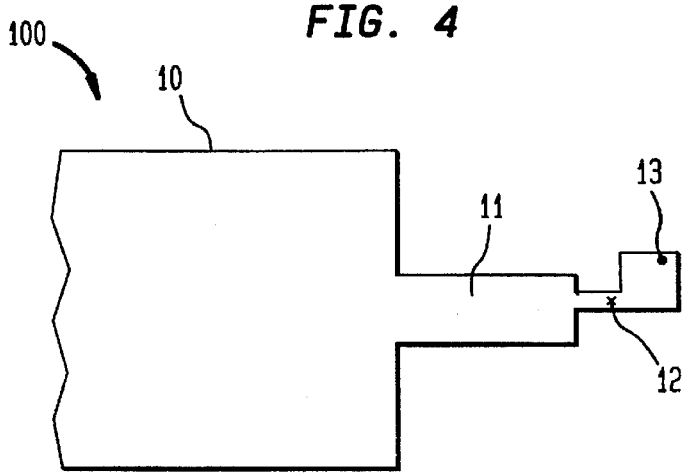
FIG. 4 is a schematic representation of the sensor.

In FIG. 2, one vibration mode is shown with dashed lines in parts a, b, and c, respectively: in FIG. 2a the transversal vibration mode T1 for measuring the z force component, in FIG. 2b the transversal vibration mode T2 for measuring the x force component, and in FIG. 2c the torsional vibration mode Φ1 for measuring the y force component. In the embodiment, the z direction is orthogonal to the surface being imaged.

In the embodiment, the torsional vibration mode is made inducible by the asymmetric distribution of the mass on arm 11.

With respect to its mechanical form, the sensor is characterized by the individual vibration mode frequencies being sufficiently separated from each other that no mode coupling occurs, and the vibrations are therefore distinguished by the different excitation frequencies. In the embodiment, a quality of ca. 1000 is achieved; this is, however, not absolutely required for obtaining usable measurements. Furthermore, the sensor is designed such that the different resonant frequencies all lie within the accessible frequency range for the force measurement. The resonance spectrum at measurement point 13 of the laser heterodynometer, with which the deflection amplitude is measured, is shown in FIG. 3a. The resonant frequencies are sufficiently separated that mode coupling is not possible. In FIG. 3b, a resonance spectrum measured at the vibration node is shown in which a deflection is possible in the z direction only. The higher vibration modes T2 and Φ1 are not subject to deflection. For this reason, the force measurement point 13 is positioned away from the tip position.

The design of the sensor in the embodiment was conducted as follows, whereby for simplified computation the added mass associated with measurement point 13 was not taken into consideration. A rectangular arm was assumed with length L, width b, thickness d, tip height h, modulus of elasticity E, shear modulus G, mass density p, total moment of inertia $J_\phi$, and strength of torsion $K_\phi$, whereby the resonant frequencies are approximately $$f_{t1} = \frac{d}{L^2} \sqrt{\frac{E}{p}} \quad ; f_{t2} = \frac{22.0}{2\pi} \frac{d}{L^2} \sqrt{\frac{E}{p}} \quad ; f_\phi = \frac{1.57}{2\pi} \sqrt{\frac{GK_\phi}{J_\phi L}}$$

$K_\phi$ and $J_\phi$ are given by $$K_\phi = bd^3 \left( \frac{16}{3} - 3.36 \frac{d}{b} \left( 1 - \frac{d^4}{12b^4} \right) \right) ; J_\phi = \frac{p}{12} dbL(b^2 + d^2) + J_{tip}$$

In the embodiment, the moment of inertia $J_{tip}$ of the tip exceeds the corresponding value of the arm and simply takes effect. For the computation, a (transversal) spring constant of the sensor at the tip location is assumed as follows:

$$k_{t1} = Eb \frac{d^3}{4L^3} \cong 2.05 Eb \frac{d^3}{4L^3}$$

For the second transversal vibration mode, there is no static spring constant. A dynamic force factor can be defined, however, as the ratio of the vibration amplitude to the quality Q times the periodic force at $f_{t2}$. Thus, for a homogeneous arm $$k_{t2}^\# \cong \left( \frac{f_{t2}}{f_{t1}} \right)^2 k_{t1} \cong 39 k_{t1}$$

With such a sensor, the tip is positioned at the vibration node. Under consideration of the tip height, the effective spring constant $k_{t2}$ in the y direction is then $$k_{t2} \cong \frac{10.8L}{h + 0.5d} k_{t1}$$

In these calculations, the limited rigidity and the mass of the tip were neglected.

The following holds for the spring constant of the rotational motion of the arm:

$$k_\phi = \frac{K_\phi G}{L\left(h+\frac{d}{2}\right)^2}$$

The embodiment thus exhibits the following values, whereby a silicon sensor measuring 60×3×3 μm and a tip height of 25 μm were assumed:

$M_{t1}$: 1.16 MHz and 32 N/m $M_{t2}$: 7.24 MHz and 325 N/m $M_\phi$: 19 MHz and 16 N/m.

Estimation of the torsional resonant frequency depends to a large extent on the size and shape of the tip.

In particular, the ratio of both transversal resonant frequencies can easily be adjusted by modifications to the arm. For example, the ratio can be reduced by tapering the arm.

The sensitivity of the force field measurement with the sensor is $$\nabla F_{min} = \frac{1}{A_0}\sqrt{\frac{27kk_0TB}{2\pi Q v_{res}}}$$

$A_O$: Vibration amplitude

K: Spring constant $k_b$: Boltzmann constant

T: Temperature

B: Bandwidth

Q: Quality

The quality can be improved by increasing the spring constant of the respective resonance mode. In FIG. 3, values of 500, 1000, and 1500 for the first transversal, second transversal, and torsional modes are indicated. The sensitivity of both transversal modes is thus approximately $10^{-5}$N/m and that of the torsional mode $10^{-6}$N/m.

The laser sensor operates on the known principle of the heterodyne interferometer, in which a laser beam, making use in particular of the property of coherence, is divided into two partial beams, and one partial beam is reflected on the surface of sensor 100 at read-out point 13. Both partial beams are subsequently reunited, in the embodiment at the semitransparent mirror at which the beam division also occurred. This reunited beam is then applied to a detector, which is able to measure the interference of both partial beams. In the embodiment, a reset logic, which can comprise a discrete circuit or a control loop integrated in the computer, is adjusted to excite the sensor such that the sensor continues to vibrate at the resonant frequency—now influenced by the surface being imaged. The amount of adjustment represents the measurement value, which is registered on an image reproducing chart as a black—or grayscale value.

In an alternative embodiment, the frequency is not adjusted but rather the vibration amplitude serves directly as the measure of the force exerted on the sensor by the surface. Here, it is accepted that only a limited dynamic measurement range is possible, since only those forces can be measured for which the resonance at its uninfluenced frequency is measurable above the noise.

Subsequent to the measurement process, the surface being imaged is moved to a new position—in the embodiment with a piezoelectric positioning element—and the measurement is repeated until a line of the surface is available. The object being imaged is then positioned with the piezoelectric positioning element to a new line, and the entire surface is thus scanned.

Figure 5A:
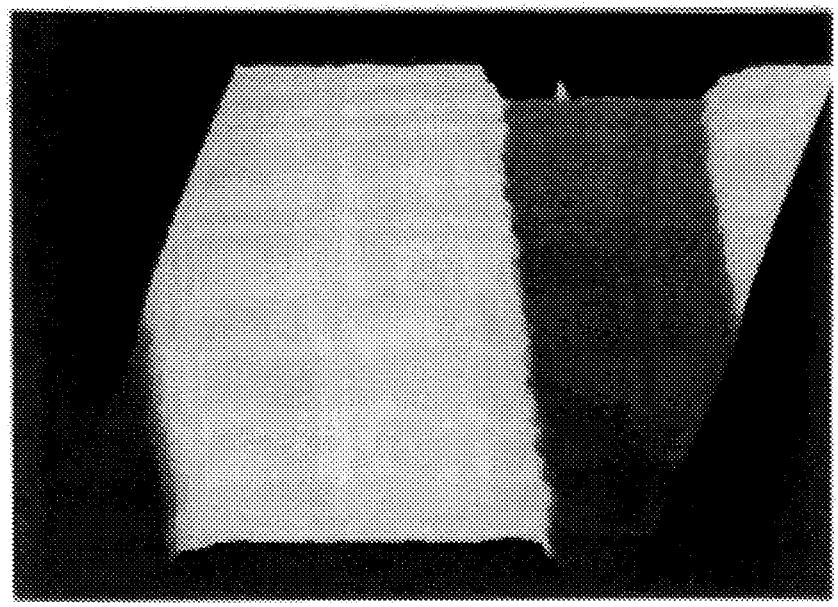
FIG. 5a), b) shows, for purposes of example, the results of measurements in two directions.

After scanning the surface in one vibration mode, the sensor is excited in the next vibration mode and the entire measurement procedure is repeated until all desired components of the force field have been measured. The components, of which two are indicated in FIGS. 5a) and b), can then be processed using a data processing system and known methods for image evaluation. Here in particular, differences in the direction of the force field can be represented as an image and made available for analysis.

In an alternative embodiment, the different vibration modes are induced at each measurement point in succession, before the position is altered with the piezoelectric positioning element, as previously described.

The experimental results of a test measurement are shown in FIG. 5. Since the tip in the experiment was not secured exactly in the vibration node of the second transversal vibration, the vibrations in the three directions are not completely decoupled. Furthermore, the torsional rigidity of the sensor was considerably higher than the transversal. Nevertheless, the experiment demonstrates the viability of implementation.

Figure 5B:
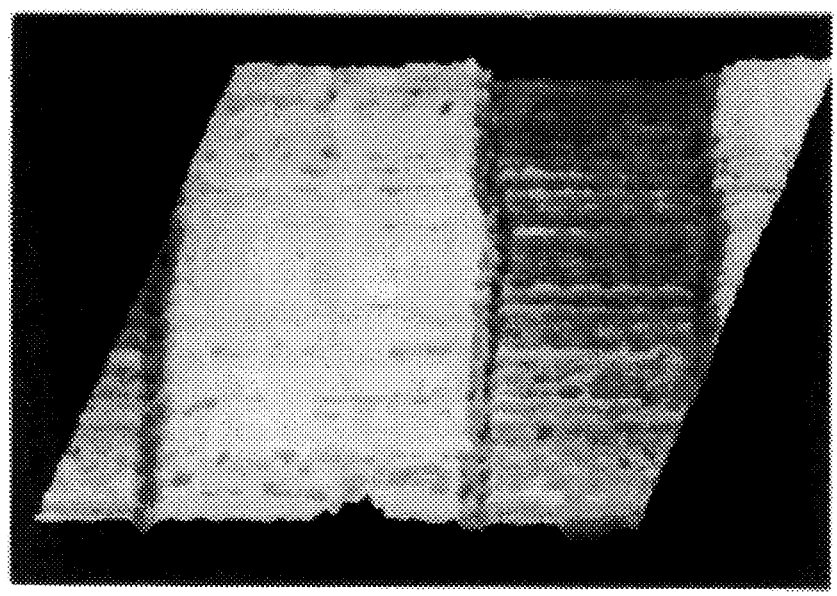

FIG. 5a) shows the measurement in the z direction at a height of 70 nm above the surface of silicon. The result of the torsional vibration is shown in FIG. 5b). The change in amplitude is evident when the tip reaches a step at which a horizontal component is overlaid by the vertical force component.

We claim:

1. Sensor for imaging a surface structure by force measurement, comprising:

a measurement probe comprising a measurement tip, an arm on which said measurement probe is mounted, whereby said measurement probe is induced to vibration in the vicinity of the surface to be imaged and the influence on the vibrations by the surface is measured, said sensor comprises means for sensing at least two different vibration modes, so as to measure components of force in directions corresponding to each of the at least two different vibration modes, said tip of said probe in said at least two different vibration modes vibrates in different directions.

2. Sensor according to claim 1, wherein said probe in at least two different vibration modes vibrates in directions orthogonal to each other.

3. Sensor according to claim 1 or 2, wherein said sensor comprises two transversal vibration modes and one torsional vibration mode, and said tip of said probe in each of the three vibration modes vibrates in one respective direction, whereby the three directions are orthogonal to each other and one vibration direction represents the direction of the tip of the probe.

4. Sensor according to any one of the claims 1 or 2 wherein said arm and said probe are made of silicon.

5. Sensor according to any one of the claims 1 or 2 wherein said arm and said probe are made of silicon nitride.

6. Sensor according to any one of the claims 1 or 2 wherein said probe has magnetic properties.

7. Force microscope with a sensor in accordance with any one of the claims 1 or 2 with a piezoelectric vibration element, with a laser measurement device, and with a device for adjusting the surface to be imaged with respect to the sensor.

8. A force microscope with a sensor in accordance with any one of the claims 1 or 2, further comprising:

a piezoelectric vibration element, a laser measurement device, and a device for adjusting the surface to be imaged with respect to the sensor.

9. Method for imaging surfaces, characterized in that a sensor in accordance with any one of the claims 1 or 2 is induced to vibration successively in different modes and the change in the resonant frequency due to the interaction of the sensor probe with the surface is measured.

10. Method in accordance with claim 9 characterized in that the object to be examined microscopically is adjusted to a new position with respect to the microscope after each measurement procedure.

11. Method in accordance with claim 9, characterized in that the vibrations are induced with a piezoelectric element vibrating in one direction.

12. Method in accordance with claim 11, characterized in that the object to be examined microscopically is adjusted to a new position with respect to the microscope after each measurement procedure.

13. Method in accordance with claim 9, characterized in that the change in the resonant frequency is conducted using a heterodyne laser measurement method.

14. A sensor for imaging a surface structure by force measurement comprising a measurement probe having a measurement tip, an arm on which said measurement probe is mounted, whereby said measurement probe is induced to vibration when brought in the vicinity of said surface to be imaged and means to measure said vibrations, said measurement tip has at least two different vibration modes, means for sensing said at least two vibration modes, so as to measure components of force in directions corresponding to each of the at least two different vibration modes, and said measurement tip of probe vibrates in at least two different directions.

15. A sensor according to claim 14, wherein said at least two directions are orthogonal to each other.

16. A sensor according to either of claims 14 or 15, wherein the sensor comprises two transversal vibration modes and one torsional vibration mode, and the tip of said probe in each of the three vibration modes vibrates in one respective direction, whereby the three directions are orthogonal to each other and one vibration direction represents the direction of the tip of the probe.

17. A sensor according to any one of the claims 14 or 15, wherein said arm and said probe are made of silicon.

18. A sensor according to any one of the claims 14 or 15, wherein said arm and said probe are made of silicon nitride.

19. A sensor according to any one of the claims 14 or 15, wherein said probe has magnetic properties.

20. A method for imaging surfaces, comprising a sensor in accordance with any one of the claims 14, or 15, is induced to vibration successively in different modes and the change in the resonant frequency due to the interaction of the sensor probe with the surface is measured.

21. A method in accordance with claim 20, wherein the vibrations are induced with a piezoelectric element vibrating in one direction.

22. A method in accordance with claim 20, wherein the change in the resonant frequency is conducted using a heterodyne laser measurement method.

23. A method in accordance with claim 20, wherein the object to be examined microscopically is adjusted to a new position with respect to the microscope after each measurement procedure.

* * * * *